(12) United States Patent
Ishida et al.

(10) Patent No.: US 6,394,049 B2
(45) Date of Patent: May 28, 2002

(54) EXHAUST VALVE DEVICE FOR TWO-CYCLE ENGINE

(75) Inventors: Junichi Ishida; Hiroyuki Uchida; Shigeyuki Hara, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/826,864

(22) Filed: Apr. 6, 2001

(30) Foreign Application Priority Data

Apr. 6, 2000 (JP) ........................................ 2000-105266

(51) Int. Cl.[7] ............................................... F02B 25/20
(52) U.S. Cl. .................................. 123/65 PE; 123/65 P
(58) Field of Search ........................... 123/65 PE, 65 P (56) References Cited

U.S. PATENT DOCUMENTS 4,732,118 A * 3/1988 Tanahashi et al. ....... 123/65 PE
5,331,927 A * 7/1994 Solomon et al. ........ 123/65 PE
5,709,177 A * 1/1998 Worth et al. ............ 123/65 PE

FOREIGN PATENT DOCUMENTS

JP        A5125945        5/1993

* cited by examiner

Primary Examiner—Marguerite McMahon
(74) Attorney, Agent, or Firm—Birch, Stewart, Kolasch & Birch, LLP (57) ABSTRACT

A common drive shaft for first and second exhaust control valves is formed of a single piece. A first exhaust valve adjusting exhaust timing and a second exhaust valve adjusting a sectional area of an exhaust passage are provided on the common drive shaft. The second exhaust valve is rotated integrally with the drive shaft. The first exhaust valve is fitted on the drive shaft via an intermediate sleeve and a torsion coil spring. A linkage mechanism is provided so that the intermediate sleeve is stopped at a limit of rotation of the first exhaust valve. Thereafter, only the second exhaust valve is rotated.

19 Claims, 9 Drawing Sheets

EXHAUST VALVE DEVICE FOR TWO-CYCLE ENGINE

BACKGROUND OF THE INVENTION

1. Field of the Invention

The present invention relates to exhaust valve devices for a two-cycle engine, and more particularly to exhaust valves for two-cycle engines provided with a first exhaust valve for varying exhaust timing of an exhaust port, and a second exhaust valve positioned in an exhaust passage for varying a sectional area of the exhaust passage. The present invention particular relates to an exhaust valve device having a simplified drive mechanism.

2. Description of the Background Art

Japanese Unexamined Patent Publication Hei 5-125945 shows an exhaust valve device of a two-cycle engine provided with a first exhaust valve for varying the timing of the opening/closing of an exhaust port, and a second exhaust valve positioned in an exhaust passage for varying a sectional area of the exhaust passage. The exhaust valves are each arranged so as to be driven and controlled by rotation with a different drive shaft.

Further, since rotation angles of the first exhaust valve and the second exhaust valve are different from each other due to a difference between the opening and closing positions, a gear drive mechanism is provided in order to vary the rotation angles.

There are several drawbacks when a separate exclusive drive shaft and a drive mechanism are provided in an attempt to drive a first exhaust valve and a second exhaust valve as in the conventional embodiment described hereinabove. The conventional arrangements have increased numbers of parts, additional weight, and increased component costs. These conventional arrangements also create a reduction in the degree of freedom permitted in design layout.

SUMMARY OF THE INVENTION

The present invention overcomes the shortcomings associated with the conventional art and achieves other advantages not realized by the conventional art.

It is an object of the present invention to reduce the number of component parts required with traditional exhaust valve operation.

It is an object of the present invention to reduce manufacturing costs and to increase the designer's options for system design layout.

It is an object of the present invention to reduce overall engine weight.

These and other aspects of the present invention are accomplished by an exhaust valve device for a two-cycle engine comprising a first exhaust valve for varying an exhaust timing of an exhaust port; a second exhaust valve for varying a sectional area of an exhaust passage; a common drive shaft rotated at a prescribed valve drive timing drivingly engaging said first exhaust valve and said second exhaust valve, wherein a second angular range of rotation of said second exhaust valve is larger than a first angular range of rotation of said first exhaust valve; and a linkage mechanism provided between said first exhaust valve and said second exhaust valve, said second exhaust valve integrally rotating with said first exhaust valve within the first angular range of rotation, and the second exhaust valve independently rotatable from said first exhaust valve when the second angular range of rotation exceeds said first angular range of rotation.

In the present invention, since a first exhaust valve and a second exhaust valve are mounted on a common drive shaft, a linkage mechanism for mutually linking operation of either valve can be provided. The first exhaust valve and the second exhaust valve are interlocked with each other up to a rotation limit of the first exhaust valve. However, only the second exhaust valve is rotated with an angle of rotation more than the first exhaust valve's rotation limit when the drive shaft is rotated with a prescribed valve drive timing.

Accordingly, since the drive shaft of both the exhaust valves can be on a common drive shaft and a single drive mechanism or linkage mechanism is utilized, a decrease in the number of part items, in weight, and in cost can be achieved. Further, an increase in a degree of freedom of design layout can be realized.

Further, a coupling member moving in an axial direction of a drive shaft is provided, the first exhaust valve and a second exhaust valve coupled and interlocked with each other by the coupling member within a first angular range of rotation of the first exhaust valve. The second exhaust valve is separated from the first exhaust valve by moving the coupling member when second angular range of rotation exceeds a first rotation limit of the first exhaust valve. The second exhaust valve independently rotates in angular rotational ranges in excess of the first rotation limit.

These and other aspects of the present invention are accomplished by an exhaust valve assembly for an engine comprising an exhaust port; an exhaust passage arranged in a downstream position with respect to said exhaust port; a valve containing chamber formed between said exhaust port and said exhaust passage; a first exhaust valve for varying an exhaust timing by varying a height of the exhaust port; a second exhaust valve for varying a sectional area of the exhaust passage; a common drive shaft rotated at a prescribed valve drive timing drivingly engaging said first exhaust valve and said second exhaust valve, wherein a second angle of rotation of said second exhaust valve is larger than a first angle of rotation of said first exhaust valve; and a linkage mechanism provided between said first exhaust valve and said second exhaust valve, the second exhaust valve independently rotatable from said first exhaust valve when the second angle of rotation exceeds a first rotation limit of the first exhaust valve.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein:

FIG. 6(a–c) are side views of a linkage mechanism according to an embodiment and various operating positions of the present invention;

DETAILED DESCRIPTION OF THE PREFERRED EMBODIMENTS

Figure 1:
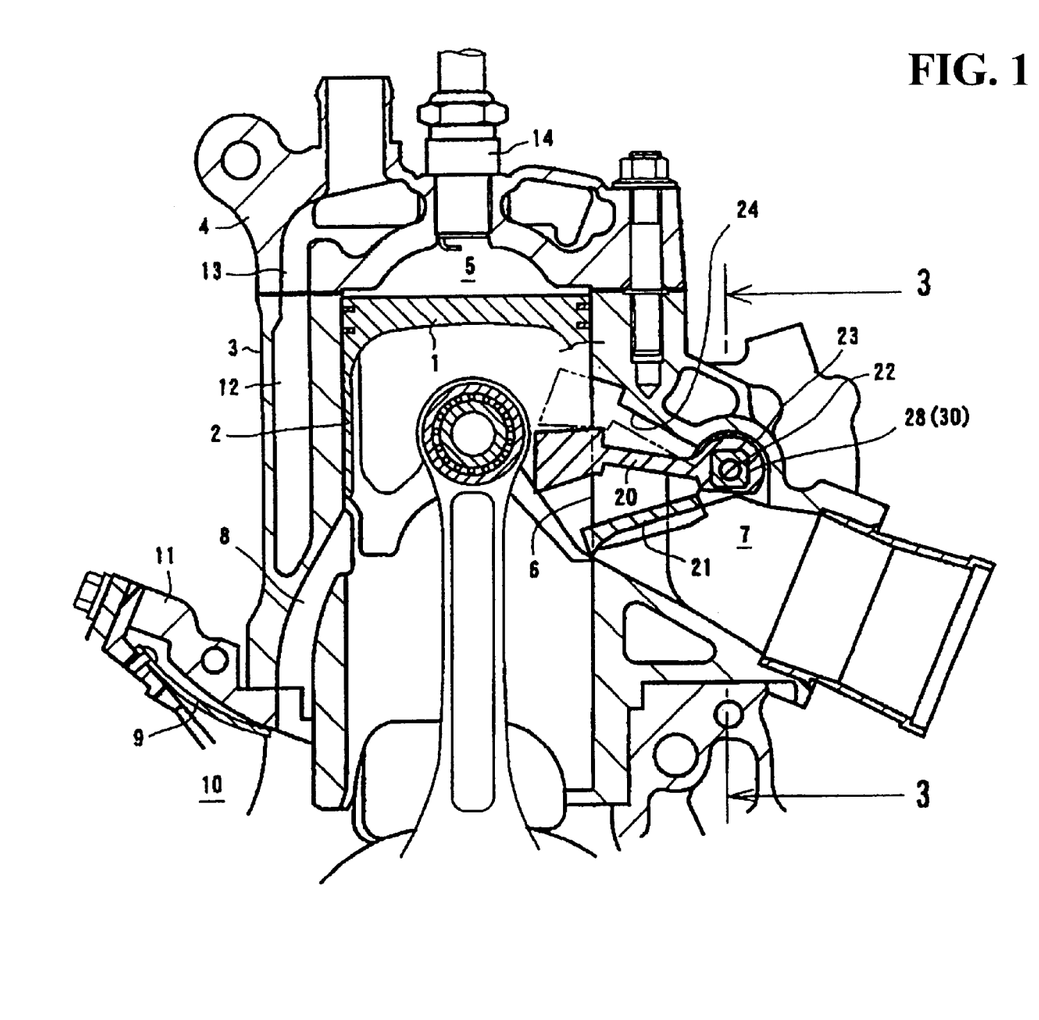
FIG. 1 is a longitudinal sectional view of an engine according to a first embodiment of the present invention.
Figure 2:
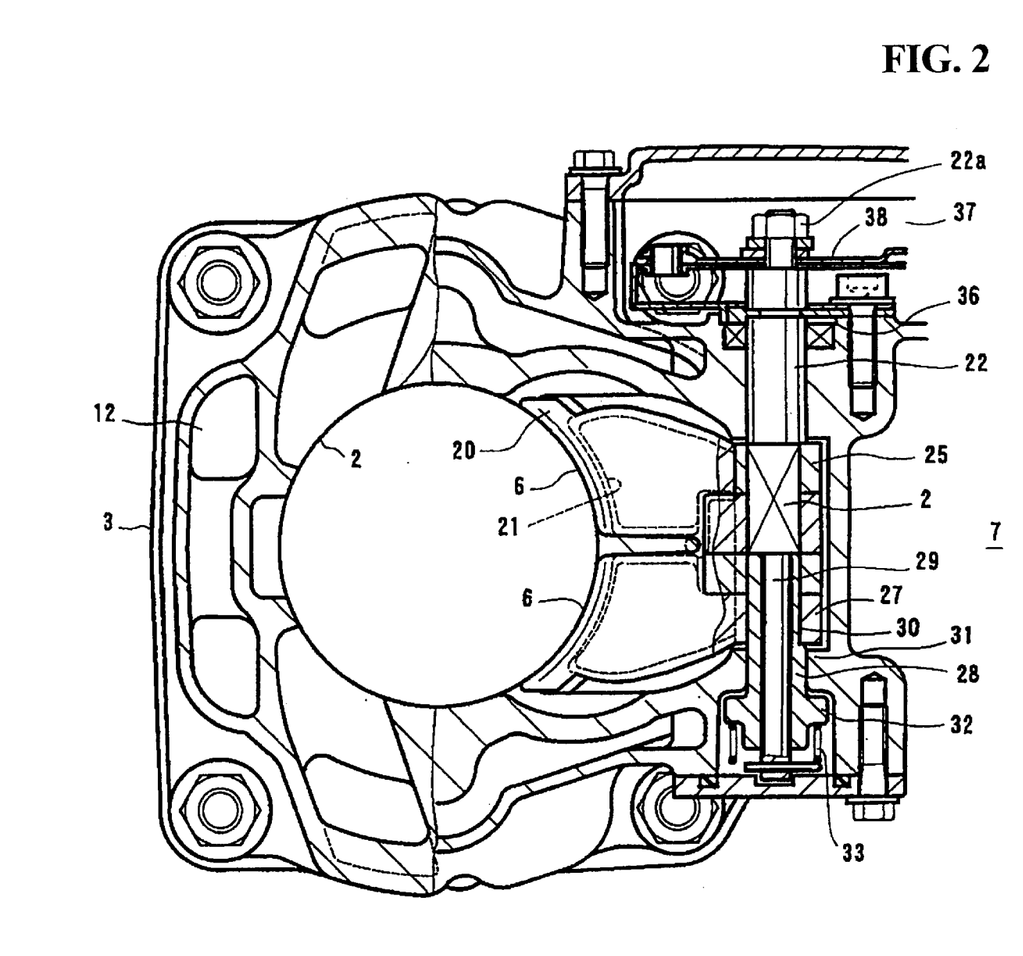
FIG. 2 is a horizontal sectional view according to the first embodiment of the present invention.
Figure 3:
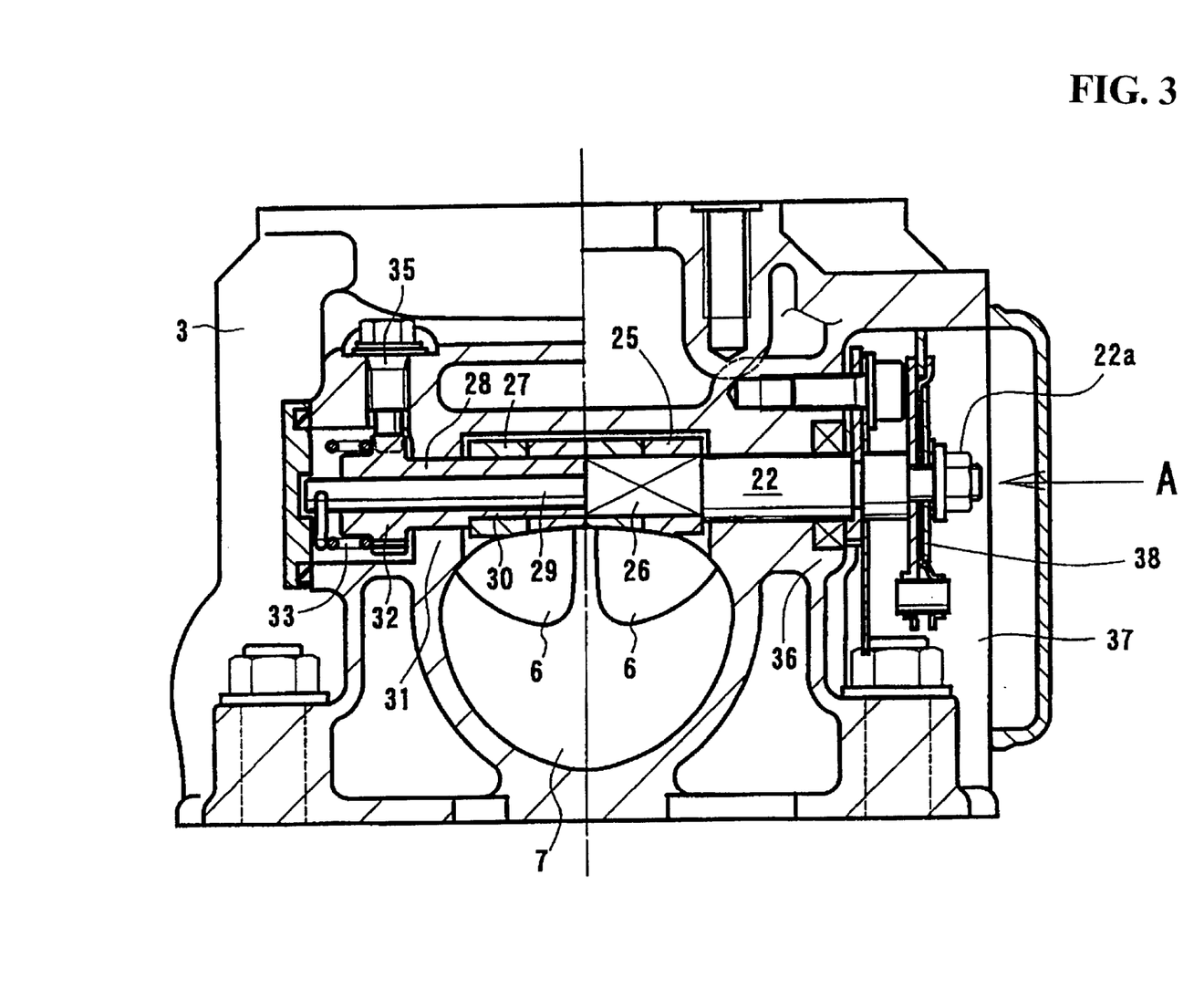
FIG. 3 is a cross-sectional view taken along line 3—3 in FIG. 1.
Figure 4:
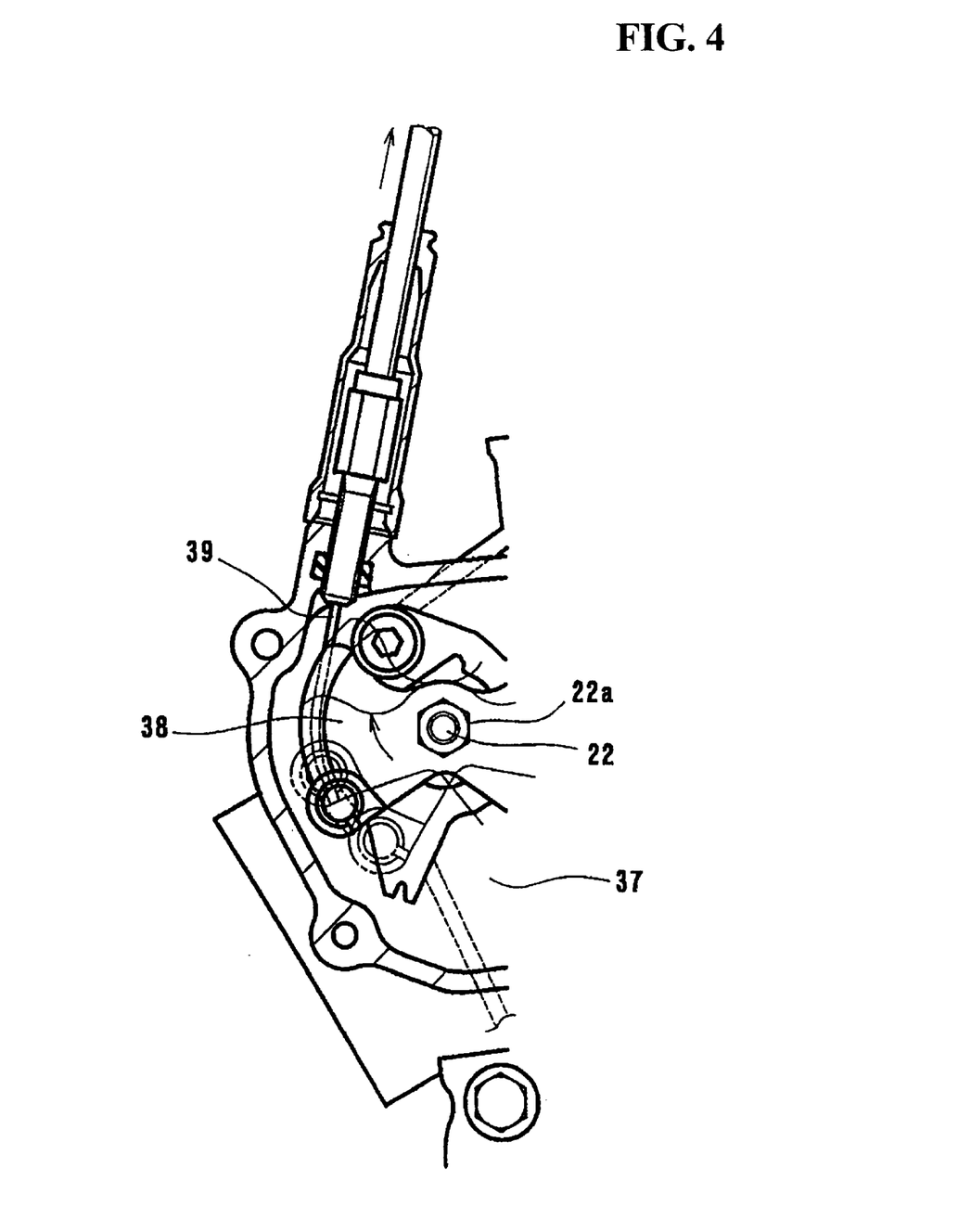
FIG. 4 is a side view of a drive mechanism viewed in the direction of an arrow A in FIG. 3.
Figure 5:
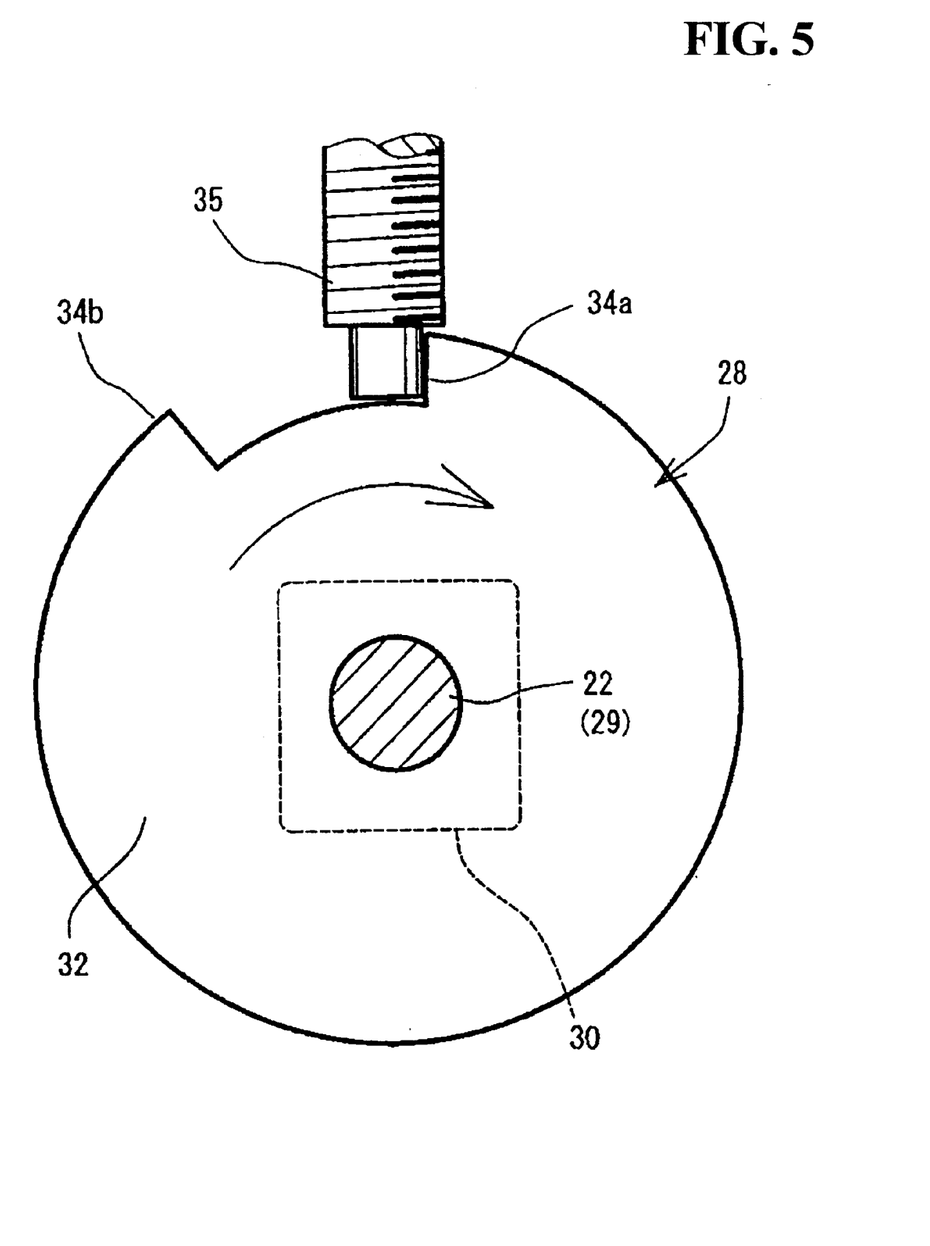
FIG. 5 is a side view of the structure of a stopper according to an embodiment of the present invention.
Figure 6A:
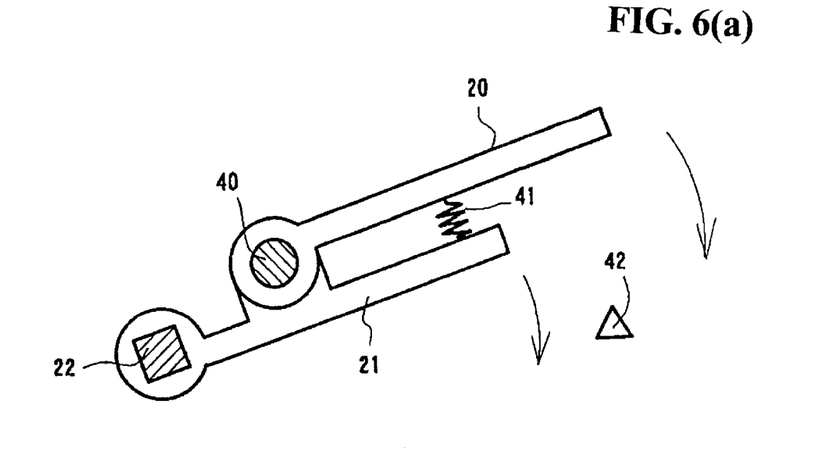
Figure 6B:
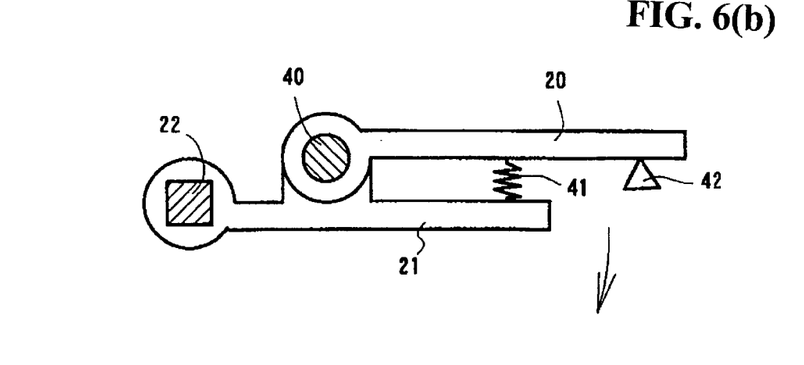
Figure 6C:
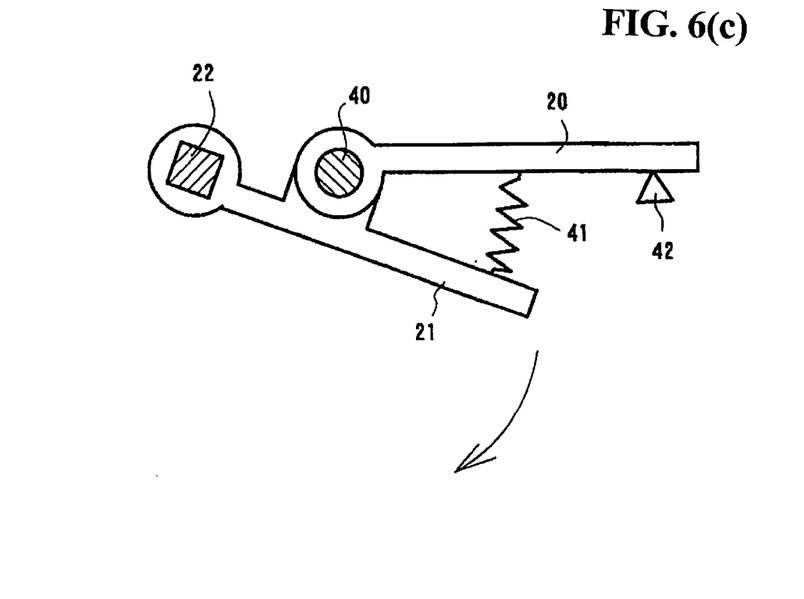

Hereinafter, the first embodiment will be explained with reference to the accompanying drawings. FIG. 1 is a longitudinal sectional view of an exhaust passage portion of a two-cycle engine of a motorcycle according to an embodiment of the present invention. FIG. 2 is a horizontal sectional view of an engine having an exhaust control valve portion. FIG. 3 is a cross-sectional view taken along line 3—3 in FIG. 1. FIG. 4 is a side view of a drive mechanism viewed in the direction of an arrow A in FIG. 3. FIG. 5 is a side view of a structure of a stopper according to an embodiment of the present invention. FIGS. 6a, 6b and 6c are side views of a linkage mechanism according to an embodiment and various operating positions of the present invention.

In FIG. 1, an engine is formed with a combustion chamber 5 between a cylinder block 3 formed with a cylinder bore 2 in which a reciprocating piston 1 is housed. A cylinder head 4 covers an upper section of the cylinder block 3. The combustion chamber 5 communicates with an exhaust passage 7 via an exhaust port 6.

The engine further includes a scavenging port 8, a reed valve 9, an intake passage 10, and a crankcase 11 arranged in an interior crankcase, intake-type structure. Further, a water jacket 12, 13 and an ignition valve 14 are also provided.

A first exhaust valve 20 and a second exhaust valve 21 are provided inside the exhaust passage 7. Each of the exhaust valves 20, 21 are driven by a common drive shaft 22. The drive shaft 22 is contained in a recess section 23 formed and provided on an upper section wall of the exhaust passage 7. An axial direction of the drive shaft 22 is arranged in parallel with a transverse direction of the exhaust passage 7.

The first exhaust valve 20 is provided in the vicinity of the exhaust port 6 as illustrated in FIG. 2 and adjusts exhaust timing by varying a height of the exhaust port 6. The first exhaust valve 20 partially opens and closes an opening section of the exhaust port 6 and is contained in a containing chamber 24 (FIG. 1) in a fully open state of the exhaust port. The containing chamber 24 is formed on an upper section wall of the exhaust passage 7 ranging from an upper section of the exhaust port 6 to the recessed section 23.

The second exhaust valve 21 is rotated inside the exhaust passage 7 on an exhaust downstream side from the exhaust port 6 and varies a sectional area of a passage of the exhaust passage 7. When the second exhaust valve 21 is in a fully open position of the exhaust passage 7, the second exhaust valve 21 is contained in the containing chamber 24 in a position substantially overlapping the first exhaust valve 20.

Further, each of the exhaust valves 20, 21 have different rotation limits with respect to the maximum angles of rotation that each valve may be rotated to prior to reaching their fully closed positions (hereinafter, refer to as a fully-closed state). The angle of rotation of the second exhaust valve 21 is larger than the angle of rotation of the first exhaust valve 20. Rotational operations of both valves are related to each other by a linkage mechanism explained hereinafter.

As shown in FIG. 2 and FIG. 3, a boss section 25 of the second exhaust valve 21 is coupled with a square sectional section 26 of the drive shaft 22. The second exhaust valve 21 is rotated integrally with the drive shaft 22. A boss section 27 of the first exhaust valve 20 is supported on a circular sectional section 29 of the drive shaft 22 via an intermediate sleeve 28.

The boss section 27 is coupled so as to integrally rotate with the intermediate sleeve 28 at a square shaft section 30 (refer to FIG. 1) on an outer peripheral side of the intermediate sleeve 28. The intermediate sleeve 28 is relatively rotatable with the drive shaft as it is fitted on the circular sectional section 29 of the drive shaft.

Further, a first end section of the intermediate sleeve 28 is freely rotatably supported to a wall section 31 of the recessed section 23 provided in the cylinder block 3. A flange 32 formed at a shaft end section is connected with the drive shaft 22 by a torsion coil spring 33.

In FIG. 5, a stopper assembly protruding diametrically is formed in a part of an outer periphery of the flange 32. The stopper assembly is provided with a first stopper 34a and a second stopper 34b installed having an interval along the circumference of the flange 32. The second stopper 34b corresponds to an operational phase when the intermediate sleeve 28 is rotated to the limit of rotation of the first exhaust valve 20. The first stopper 34a corresponds to an operational phase when the sleeve 28 is at a fully open position of the valve 20 and is brought into contact with a bolt 35 arranged in proximity to an outer peripheral section of the flange 32.

Further, the first exhaust valve 20 rotates clockwise as shown by the arrow in FIG. 5 in order to control a height of the exhaust port 6. When an angle of rotation of the drive shaft reaches the first rotation limit of the first exhaust valve, the second stopper 34b is brought into contact with the bolt 35. The intermediate sleeve 28 is then regulated to rotate and exceeds the first rotation limit. Accordingly, the first exhaust valve 20 is set so as to stop rotation at the limit of rotation and the second exhaust valve can still rotate toward its fully closed position.

On the other hand, when the angle of rotation of the first exhaust valve 20 is within the rotation limit, neither of the first stopper 34a and the second stopper 34b are brought into contact with the bolt 35. Therefore, the intermediate sleeve 28 is in a free state of rotation, and the first exhaust valve 20 can be freely opened and closed. The bolt 35 is mounted on the cylinder block 3 as illustrated in FIG. 3.

As seen in FIG. 2 and FIG. 3, an end section of the drive shaft 22 is freely rotatably supported to a wall section 36 of the cylinder block 3 on a side of the exhaust passage 7 opposite to the wall section 31 where the intermediate sleeve 28 is provided. The end section of the drive shaft protrudes outwardly toward a drum chamber 37 formed outward from the wall section 36. A drum 38 is mounted by a nut 22a in the drum chamber 37.

As shown in FIG. 4, the drum 38 is driven and controlled on the basis of rotational speed of the engine by a control device such as a computer (not shown) via a wire cable 39.

When exhaust gas is adjusted, the wire cable 39 is pulled in an upward motion (in the embodiment shown in FIG. 4) and the drum 38 is rotated.

For example, the drive shaft 22 is integrally rotated in a clockwise rotational direction. The first exhaust valve 20 and the second exhaust valve 21 are rotated toward a closing position when the drive shaft 22 is rotated clockwise. As described above, the linkage mechanism is arranged between the first exhaust valve 20 and second exhaust valve 21.

Next, an operation of the present embodiment will be explained with reference to the accompanying figures. FIGS. 6a, 6b and 6c show a linkage mechanism between the first exhaust valve 20 and the second exhaust valve 21 relating to the present embodiment and the operational principles involved in each step. In this figure, the first exhaust valve 20 is mounted on a different shaft 40 from the driving shaft 22 relative to the second exhaust valve 21. However, the use of two separate drive shafts in these figures is merely utilized to facilitate the explanation of the operational principles of the present invention.

Additionally, the present invention can optionally incorporate separate drive shafts as long as they share a common drive mechanism.

Further, an optional tension coil spring 41 is interposed between the first exhaust valve 20 and the second exhaust valve 21 in FIGS. 6a, 6b and 6c. However, this arrangement could be considered as a substitute for the preferred torsion coil spring 33 described hereinabove.

Firstly, in the non-adjusted position of the valves as illustrated in FIG. 6(a), both the first exhaust valve 20 and the second exhaust valve 21 are in a stored state (fully open state). Further, a relative distance between the positions of the first exhaust valve 20 and the second exhaust valve 21 is relatively small as the exhaust valves are restricted via the tension coil spring 41.

Next, in the start adjustment position as illustrated in FIG. 6(b), since the drive shaft 22 is rotated, the second exhaust valve 21 is rotated integrally with the drive shaft 22. Further, the first exhaust valve 20 is also rotated integrally with the drive shaft 22 up until the point where a first rotation limit is reached (near element 42) as the first exhaust valve 20 moves toward its respective fully closed state.

When the first exhaust valve 20 and the second exhaust valve 20 arrive at the rotation limit of the first exhaust valve 20 as illustrated in FIG. 6(b), the rotation of the first exhaust valve 20 is stopped by a stopper 42. From this point forward, as illustrated in FIG. 6(c), only the second exhaust valve 21 continues to rotate with the drive shaft 22 against the force of the tension coil spring 41. Accordingly, the relative distance between the two valves increases until the second exhaust valve 21 stops its rotation.

The operational state of FIG. 6(c) is applicable to the embodiment of FIGS. 1 to 5. The state where the first exhaust valve 20 has its rotation stopped by the stopper 42 is equivalent to the state where the second stopper 34b of the intermediate sleeve 28 is brought into contact with the bolt 35 and stops rotation thereof. When the second exhaust valve 21 extends the tension coil spring 41 and the relative distance between the first exhaust valve 20 and the second exhaust valve 21 is increased, this state is equivalent to the state where the intermediate sleeve 28 has its rotation stopped and the drive shaft 22 is rotated while twisting the torsion coil spring 33.

The first exhaust valve 20 and the second exhaust valve 21 can simultaneously be driven and controlled by the common drive shaft 22 and the linkage mechanism. Since a first exhaust valve 20 and a second exhaust valve 21 are mounted on a common drive shaft 22, a linkage mechanism for mutually linking operation of either valve can be provided.

The first exhaust valve 20 and the second exhaust valve 21 are interlocked with each other up to a rotation limit of the first exhaust valve 20. However, only the second exhaust valve 21 is rotated with an angle of rotation more than the first exhaust valve's 20 rotational limit when the drive shaft is rotated with a prescribed valve drive timing.

Accordingly, since the drive shaft of both the exhaust valves can be on a common drive shaft and a single drive mechanism or linkage mechanism is utilized, a decrease in the number of parts, a reduction in the weight, and a reduction in costs can all be achieved. Further, an increase in a degree of freedom of design layout can be realized.

Figure 7:
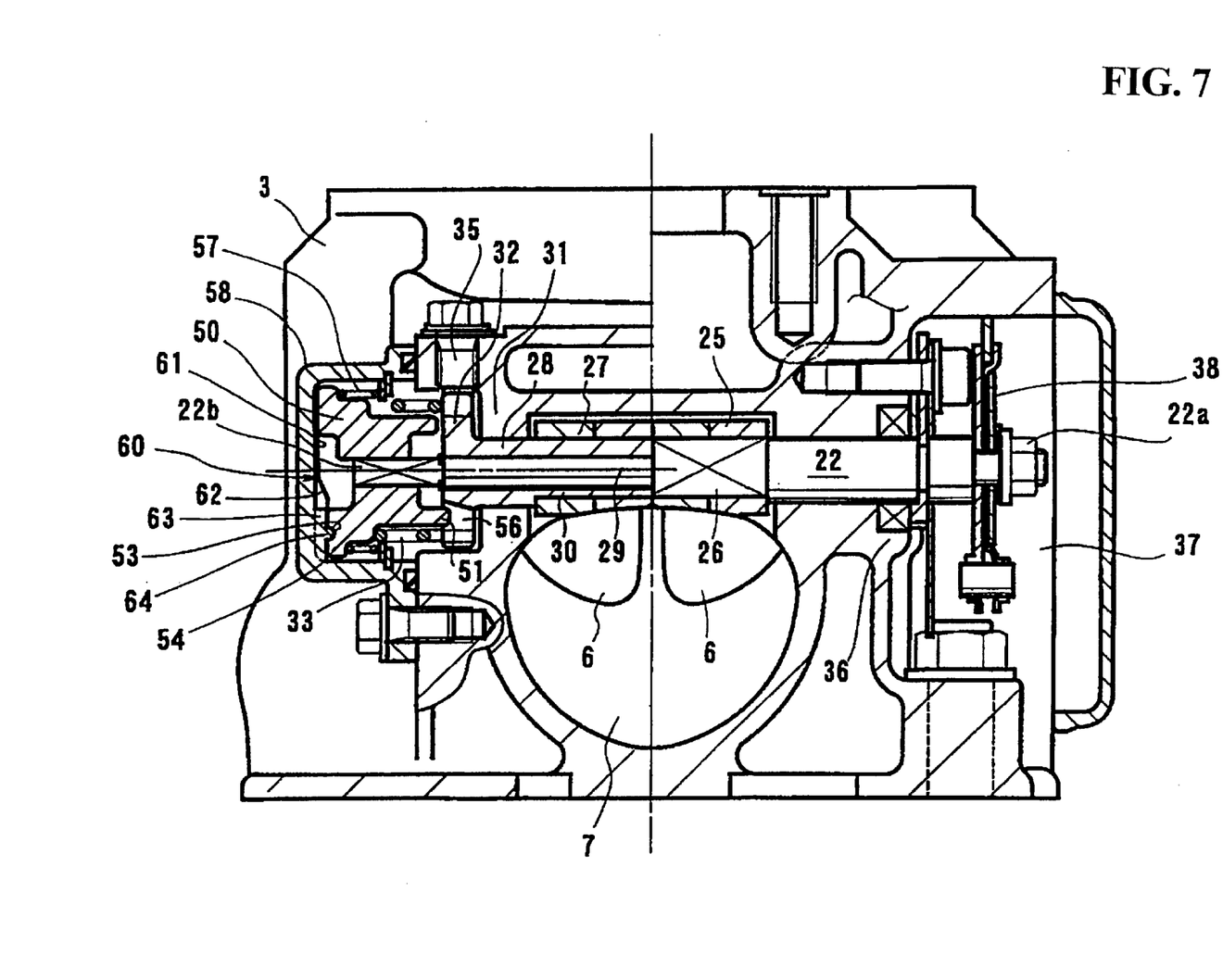
FIG. 7 is a cross-sectional view according to a second embodiment of the present invention.
Figure 8:
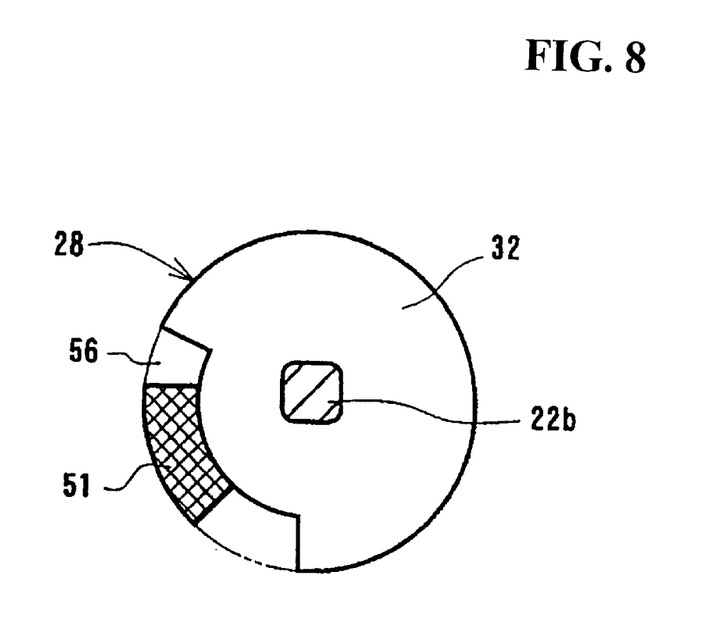
FIG. 8 is a side view of an engaging recessed section of a flange according to an embodiment of the present invention.
Figure 9:
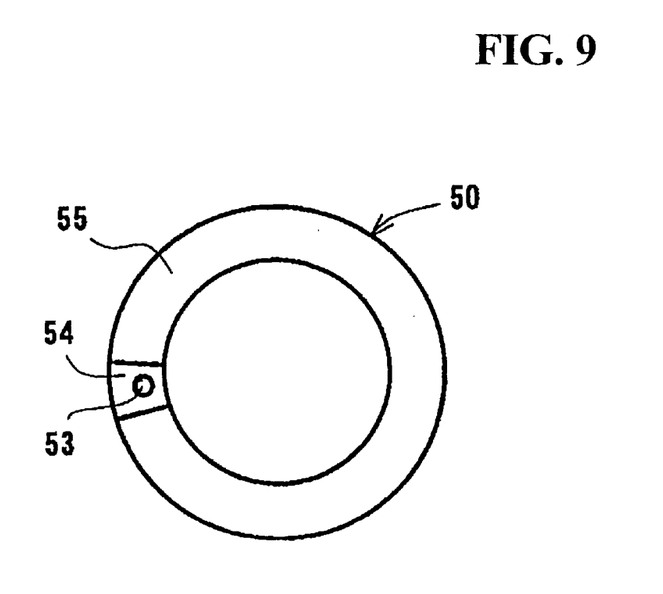
FIG. 9 is a side view of a sliding surface of a coupling member according to an embodiment of the present invention.
Figure 10:
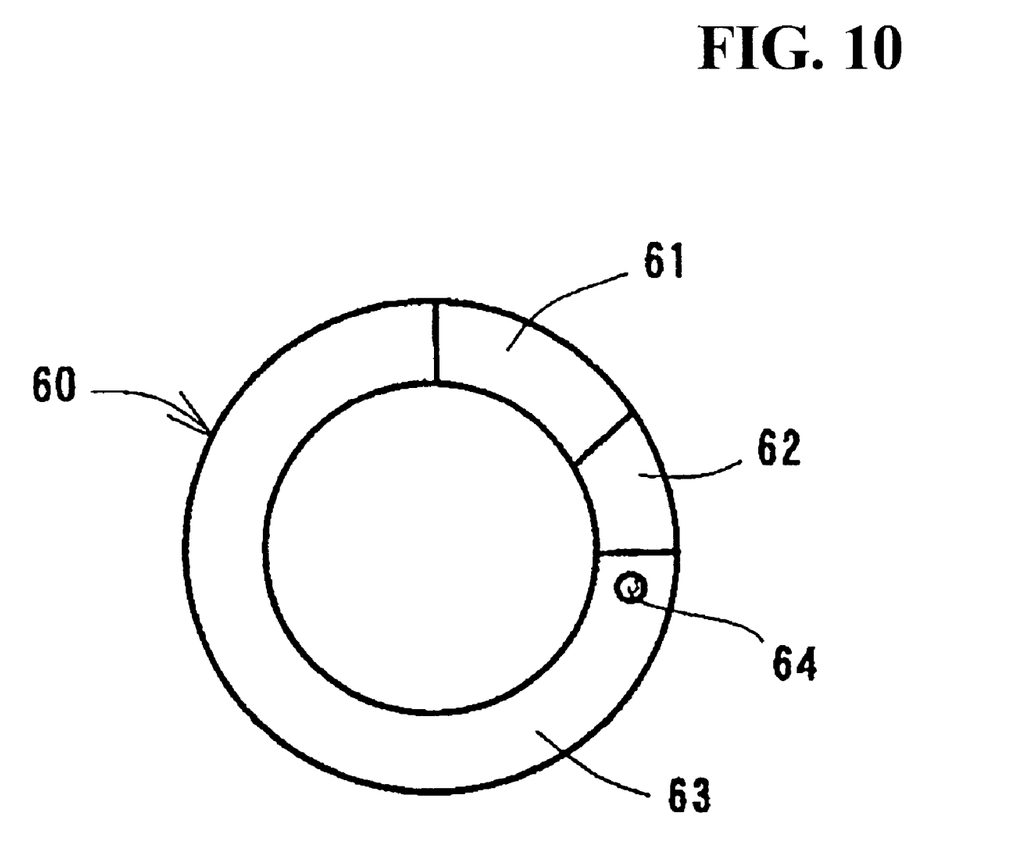
FIG. 10 is a side view of an end face cam of a fixing cover according to an embodiment of the present invention.

Next, a second embodiment will be explained with reference to the accompanying drawings. FIG. 7 is a cross-sectional view according to a second embodiment of the present invention. FIG. 8 is a side view of an engaging recessed section of a flange according to an embodiment of the present invention. FIG. 9 is a side view of a sliding surface of a coupling member according to an embodiment of the present invention. FIG. 10 is a side view of an end face cam of a fixing cover according to an embodiment of the present invention.

With respect to the operation of the coupling member shown in FIG. 7, an upper stage is shown in a non-engagement state, and a lower stage is simultaneously shown in an engagement state.

In FIG. 7, the intermediate sleeve 28 and the shaft end section 22b of the drive shaft 22 are connected with each other via a coupling member 50. Since the shaft end section 22b is formed in a square cross section (refer to FIG. 8), the coupling member 50 is fitted on the shaft end section 22b of the drive shaft 22 and is integrally rotatable and axially freely movable. Further, the coupling member 50 is coupled with the flange 32 of the intermediate sleeve 28 by the torsion coil spring 33.

An engaging projection 51 is formed projecting to the flange 32 side of the coupling member 50 in an axial direction and facing toward the intermediate sleeve 28. The engaging projection 51 is freely disengageable with an engaging recess section 56 of the flange 32 illustrated in FIG. 8.

The engaging recess section 56 is cut out of a side face of the flange 32 in a shape of arc. The coupling member 50 and the intermediate sleeve 28 are set in a positional relationship in such a manner that when both of them are rotated to the first rotation limit of the first exhaust valve 20, disengagement is possible.

An end face of the coupling member 50 on a side opposite to a side facing toward the flange 32 has a sliding surface 52 in a shape of a ring as illustrated in FIG. 9. A click groove 53 is formed in a portion of the sliding surface 52. Further, a portion forming the click groove 53 has a projecting section 54, and the remaining portion has a relatively low recessed section 55.

The coupling member 50 is pushed toward an inner face of a fixed cover 58. The coupling member 50 is pushed toward the fixed cover 58 of a containing chamber by means of a return spring 57 against an end face cam 60 formed on an inner face facing toward the sliding surface 52.

The end face cam 60 has a lower section 61 as illustrated in FIG. 10, and an intermediate section 62 formed having a slanted face, and a high section 63. An engagement projection 64 for engaging with a click groove 53 is provided in a part of the high section 63.

The high section 63 corresponds to a rotational range of the first exhaust valve 20 when a projection part 54 of the sliding surface 52 is overlapped with this portion. The coupling member 50 is pushed toward the right hand side in FIG. 7 against the elastic force of the return spring 57. The engagement projection 51 is engaged with the engagement recess section 56 of the flange 32. Accordingly, a state as shown in the operational positions of FIG. 6(a) and FIG. 6(b) is generated in which the intermediate sleeve 28 and a drive shaft 22 are rotated integrally with each other.

Further, when the projection section 54 of the coupling member 50 is moved on the low section 61, the coupling member 50 is pushed toward the fixing cover 58 via the elastic force of the return spring 57. The projection section 54 drops down to the lower section 61, and the engaging projection 51 disengages from the engaging recess section 56 of the flange 32. Accordingly, the coupling member 50 and the intermediate sleeve 28 are only connected to each other via the torsion coil spring 33. The coupling member 50 and the drive shaft 22 are relatively rotated against the torsion coil spring 33 relative to the intermediate sleeve 28. The rotation of the coupling member 50 is stopped by the stopper 34 and results in the state corresponding to that shown in FIG. 6(c).

Next, an operation of the present embodiment will be explained with reference to the accompanying drawings. First, when the first exhaust valve 20 and the second exhaust valve 21 are rotated integrally with each other, the projection section 54 of the coupling member 50 is positioned on the high section 64 of the end face cam 60. The engaging projection 64 is fitted in the click groove 53 so that the coupling member 50 and the end face cam 60 are integral with each other.

Further, since the engaging projection 51 is fitted in the engaging recess section 56 of the flange 32, the first exhaust valve 20 and the second exhaust valve 21 are integrally rotated with each other by the rotation of the drive shaft 22.

When the first rotation limit of the first exhaust valve 20 is met, the rotation of the intermediate sleeve 28 is stopped by the bolt 35. Further, the projection section 54 moves above the low section 61 of the end face cam 60 and the coupling member 50 is pushed out in the direction of fixing cover 58 by the return spring 57. In addition, the engaging projection 51 then becomes disengaged from the engaging recessed section 56.

Therefore, the drive shaft 22 together with the coupling member 50 continue their rotation while the intermediate sleeve 28 remains in non-rotating state facing toward the torsion coil spring 33. The drive shaft 22 and coupling member 50 continue their rotation up to the second rotation limit of the second exhaust valve 21.

Thereafter, the rotation of the drive shaft 22 is reversed for the purpose of returning to a fully open state. First, the coupling member 50 is rotated by the elastic force of the torsion coil spring 33. The projection section 54 is slid on the intermediate section 62 having a slanted face and rides above the high section 63 of the end face cam 60.

The engaging projection 64 also engages with the click groove 53. Simultaneously, the coupling member 50 moves on a right hand side in FIG. 7 against the return spring 57 and the engaging projection 51 engages with the engaging recessed section 56. The first exhaust valve 20 and the second exhaust valve 20 are again integrally formed with each other to thereby return to the fully open position by the reverse rotation of the drive shaft 22.

The drive shaft 22 is disengaged from the intermediate sleeve 28 at the first rotation limit of the first exhaust valve 20, and the drive shaft is directly connected with the intermediate sleeve 28 via the coupling member 50 within the rotation limit of the first exhaust valve 20. When the first exhaust valve 20 is returned to a fully open side storing position from the fully closed side, the first exhaust valve 20 can be returned surely by the engagement of the coupling member 50 without relying upon restoring force of the torsion coil spring 33. Accordingly, accurate opening/closing control of the first exhaust valve 20 is obtained.

In particular, in a state of high exhaust pressure where the possibility to experience operational error with the first exhaust valve 20 or the like is high, a stable operation can be ensured, and reliability in such instances can be improved. Further, since the engagement between the coupling member 50 and the high section 64 of the cam 60 can be performed between the engaging projection 64 and the click groove 53, the coupling can be strengthened to thereby obtain a moderate click-stop engagement.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust valve device for a two-cycle engine comprising:
a first exhaust valve for varying an exhaust timing of an exhaust port;
a second exhaust valve for varying a sectional area of an exhaust passage;
a common drive shaft rotated at a prescribed valve drive timing drivingly engaging said first exhaust valve and said second exhaust valve, wherein a second angular range of rotation of said second exhaust valve is larger than a first angular range of rotation of said first exhaust valve; and
a linkage mechanism provided between said first exhaust valve and said second exhaust valve, said second exhaust valve integrally rotating with said first exhaust valve within the first angular range of rotation, and the second exhaust valve independently rotatable from said first exhaust valve when the second angular range of rotation exceeds said first angular range of rotation.

2. The exhaust valve device according to claim 1, wherein said linkage mechanism is integrally mounted on said drive shaft and said first exhaust valve is mounted on said drive shaft via a spring.

3. The exhaust valve device according to claim 2, further comprising a stopper member provided for regulating a first rotation limit of said first exhaust valve.

4. The exhaust valve device according to claim 3, wherein said linkage mechanism comprises a coupling member integrally rotatable with said drive shaft, and axially moveable with respect to an axial direction of said drive shaft.

5. The exhaust valve device according to claim 4, wherein said coupling member is freely engageable with said first exhaust valve with respect to the axial direction of said drive shaft.

6. The exhaust valve device according to claim 4, wherein said coupling member is freely engageable with said second exhaust valve when the second angular range of rotation is less than or equal to the first angular range of rotation of said first exhaust valve.

7. The exhaust valve device according to claim 4, wherein said coupling member disengages from said second exhaust valve when the second angular range of rotation exceeds the first angular range of rotation.

8. The exhaust valve device according to claim 1, further comprising a stopper assembly for limiting a first rotation limit and a second rotation limit.

9. The exhaust valve device according to claim 8, wherein said stopper assembly includes a flange, at least one stopper, and a bolt.

10. An exhaust valve assembly for an engine comprising:
   an exhaust port;
   an exhaust passage arranged in a downstream position with respect to said exhaust port;
   a valve containing chamber formed between said exhaust port and said exhaust passage;
   a first exhaust valve for varying an exhaust timing by varying a height of the exhaust port;
   a second exhaust valve for varying a sectional area of the exhaust passage;
   a common drive shaft rotated at a prescribed valve drive timing drivingly engaging said first exhaust valve and said second exhaust valve, wherein a second angle of rotation of said second exhaust valve is larger than a first angle of rotation of said first exhaust valve; and
   a linkage mechanism provided between said first exhaust valve and said second exhaust valve, the second exhaust valve independently rotatable from said first exhaust valve when the second angle of rotation exceeds a first rotation limit of the first exhaust valve.

11. The exhaust valve assembly according to claim 10, said second exhaust valve integrally rotatable with said first exhaust valve when said second angle of rotation is within the first rotation limit of the first exhaust valve.

12. The exhaust valve assembly according to claim 11, further comprising:
   a fully open position;
   a fully closed position; and
   a plurality of partially open positions.

13. The exhaust valve assembly according to claim 12, wherein the first exhaust valve and the second exhaust valve are contained in the valve containing chamber in the fully open position.

14. The exhaust valve assembly according to claim 13, wherein the valve containing chamber is formed within a recess of an upper wall section of the exhaust passage.

15. The exhaust valve assembly according to claim 10, further comprising a stopper assembly for limiting the first rotation limit of the first exhaust valve.

16. The exhaust valve assembly according to claim 15, wherein said stopper assembly includes a flange, at least one stopper, and a bolt.

17. The exhaust valve assembly according to claim 15, further comprising:
   a cam;
   a flange drivingly engaged with an intermediate sleeve and having an arc-shaped engaging recess section; and
   an engaging projection of a coupling member for drivingly engaging said engaging recess section.

18. The exhaust valve assembly according to claim 10, further comprising
   an intermediate sleeve;
   a shaft end section of the drive shaft; and
   a coupling member connecting said intermediate sleeve and said shaft end of the drive shaft.

19. The exhaust valve assembly according to claim 18, wherein said coupling member is coupled with a flange of the intermediate sleeve by a torsion coil spring.

* * * * *